(12) United States Patent
Murphy et al.

(10) Patent No.: US 7,128,766 B2
(45) Date of Patent: *Oct. 31, 2006

(54) TRIACYLGLYCEROL BASED WAX COMPOSITIONS

(75) Inventors: Timothy A. Murphy, Derby, KS (US); Robert E. Wainwright, Matthews, NC (US)

(73) Assignee: Cargill, Incorporated, Wayzata, MN (US)

( * ) Notice: Subject to any disclaimer, the term of this patent is extended or adjusted under 35 U.S.C. 154(b) by 149 days.

This patent is subject to a terminal disclaimer.

(21) Appl. No.: 09/963,104

(22) Filed: Sep. 25, 2001

(65) Prior Publication Data

US 2003/0057599 A1    Mar. 27, 2003

(51) Int. Cl.
*C11C 5/00* (2006.01)
*C07C 53/00* (2006.01)

(52) U.S. Cl. .................. 44/275; 431/288; 554/169; 554/223; 554/227

(58) Field of Classification Search .......... 44/275; 431/288; 554/169, 223, 227
See application file for complete search history.

(56) References Cited

U.S. PATENT DOCUMENTS

| | | | |
|---|---|---|---|
| 1,935,946 A | 11/1933 | Egan et al. ............... 87/21 |
| 1,954,659 A | 4/1934 | Will ............................ 87/21 |
| 2,784,891 A | 3/1957 | Thielke |
| 3,630,697 A | 12/1971 | Duling et al. ............ 44/7.5 |
| 3,645,705 A | 2/1972 | Miller et al. .............. 44/7.5 |
| 3,744,956 A | 7/1973 | Hess ........................... 431/126 |
| 3,844,706 A | 10/1974 | Tsaras ........................ 431/288 |
| 4,118,203 A | 10/1978 | Beardmore et al. ........... 44/7.5 |
| 4,134,718 A | 1/1979 | Kayfetz et al. ............. 431/125 |
| 4,293,345 A | 10/1981 | Zeilstra et al. ............. 106/270 |
| 4,314,915 A | 2/1982 | Wiegers et al. ......... 252/522 R |
| 4,411,829 A | 10/1983 | Schulte-Elte et al. ... 252/522 R |
| 4,434,306 A | 2/1984 | Kobayashi et al. ......... 568/820 |
| 4,554,107 A | 11/1985 | Takao |
| 4,567,548 A | 1/1986 | Schneeberger ............... 362/161 |
| 4,608,011 A | 8/1986 | Comstock .................... 431/324 |
| 4,614,625 A | 9/1986 | Wilson ........................... 264/6 |
| 4,623,488 A | 11/1986 | Takao |
| 4,759,709 A | 7/1988 | Luken, Jr. et al. ........... 431/288 |
| 4,813,975 A | 3/1989 | Poulina et al. .............. 44/7.5 |
| 4,842,648 A | 6/1989 | Phadoemchit et al. ....... 106/244 |
| 4,855,098 A | 8/1989 | Taylor ........................ 264/103 |
| 5,171,329 A | 12/1992 | Lin .............................. 44/275 |
| 5,258,197 A | 11/1993 | Wheeler et al. |
| 5,380,544 A | 1/1995 | Klemann et al. |
| 5,578,089 A | 11/1996 | Elsamaloty .................. 44/275 |
| 5,660,865 A | 8/1997 | Pedersen et al. |
| 5,700,516 A | 12/1997 | Sandvick et al. |
| 5,753,015 A | 5/1998 | Sinwald et al. .......... 106/31.34 |
| 5,843,194 A | 12/1998 | Spaulding .................... 44/275 |
| 5,885,600 A | 3/1999 | Blum et al. ................. 424/405 |
| 6,001,286 A | 12/1999 | Sleeter |
| 6,019,804 A | 2/2000 | Requejo et al. ............... 44/275 |
| 6,022,402 A | 2/2000 | Stephenson et al. ........ 106/31.1 |
| 6,063,144 A | 5/2000 | Calzada et al. ............... 44/275 |
| 6,099,877 A | 8/2000 | Schuppan .................... 426/104 |
| 6,103,308 A | 8/2000 | Floyd et al. |
| 6,106,597 A | 8/2000 | Starks et al. ............. 106/31.08 |
| 6,127,326 A | 10/2000 | Dieckmann et al. |
| 6,132,742 A | 10/2000 | Le Bras et al. ............. 424/401 |
| 6,156,369 A | 12/2000 | Eger et al. .................. 426/601 |
| 6,201,053 B1 | 3/2001 | Dieckmann et al. |
| 6,214,918 B1 | 4/2001 | Johnson et al. ............. 524/487 |
| 6,238,926 B1 | 5/2001 | Liu et al. |
| 6,258,965 B1 | 7/2001 | O'Lenick, Jr. |
| 6,276,925 B1 | 8/2001 | Varga ......................... 431/288 |
| 6,284,007 B1 * | 9/2001 | Tao ............................. 44/275 |
| 6,497,735 B1 * | 12/2002 | Tao ............................. 44/275 |
| 6,503,285 B1 * | 1/2003 | Murphy ....................... 44/275 |
| 6,582,728 B1 | 6/2003 | Platz et al. |
| 6,582,748 B1 | 6/2003 | Loh et al. |
| 6,599,334 B1 | 7/2003 | Anderson |
| 6,645,261 B1 * | 11/2003 | Murphy et al. ............... 44/275 |
| 6,770,104 B1 * | 8/2004 | Murphy ....................... 44/275 |
| 6,773,469 B1 | 8/2004 | Murphy |
| 6,797,020 B1 * | 9/2004 | Murphy ....................... 44/275 |
| 6,824,572 B1 * | 11/2004 | Murphy ....................... 44/275 |
| 6,852,140 B1 | 2/2005 | Roeske |
| 2001/0013195 A1 | 8/2001 | Tao ............................. 44/275 |
| 2002/0144455 A1* | 10/2002 | Bertrand et al. ............. 44/275 |
| 2002/0157303 A1 | 10/2002 | Murphy et al. |
| 2003/0008257 A1* | 1/2003 | Tao ............................. 431/288 |

(Continued)

FOREIGN PATENT DOCUMENTS

EP    0 685 554 A1    12/1995

(Continued)

OTHER PUBLICATIONS

Behren et al., "Beeswax and other Non-Paraffin Waxes," (6 pages), Presented at NCA Technical Meeting (Jun. 19-20, 1991).

(Continued)

*Primary Examiner*—Cephia D. Toomer
(74) *Attorney, Agent, or Firm*—Foley & Lardner LLP

(57) ABSTRACT

Wax compositions that have a high triacylglycerol content are provided. The wax compositions can be used to produce candle and are particularly useful in the production of container candles. The wax compositions commonly have a melting point of about 50° C. to 57° C. and include a triacylglycerol component which has a fatty acid composition including about 14 to 25 wt. % 16:0 fatty acid; about 20 to 30 wt. % 18:0 fatty acid; and about 45 to 60 wt. % 18:1 fatty acid. Methods of producing candles from a triacylglycerol-based wax and kits, which include the triacylglycerol-based wax, are also provided.

22 Claims, No Drawings

U.S. PATENT DOCUMENTS

| | | | |
|---|---|---|---|
| 2003/0017431 | A1 | 1/2003 | Murphy |
| 2003/0022121 | A1 | 1/2003 | Biggs |
| 2003/0046860 | A1* | 3/2003 | Tiffany et al. ............... 44/275 |
| 2003/0061760 | A1 | 4/2003 | Tao et al. |
| 2003/0110683 | A1 | 6/2003 | Murphy |
| 2003/0176300 | A1 | 9/2003 | Kodali et al. |
| 2004/0221504 | A1 | 11/2004 | Murphy |

FOREIGN PATENT DOCUMENTS

| | | |
|---|---|---|
| JP | 4059897 A | 2/1992 |
| JP | 2505128 B2 | 6/1996 |
| WO | WO 96/00815 | 1/1996 |
| WO | WO 96/14373 | 5/1996 |

OTHER PUBLICATIONS

Bell et al., "Sperm Oil Replacements: Synthetic Wax Esters from Selectively Hydrogenated Soybean and Linseed Oils," *Journal of the American Oil Chemists' Society*, 54, pp. 259-263 (Jun. 1977).

Pages from Bitter Creek Candle Supply, Inc., Website (http://www.execpc.com/~bcsupply; now @ http://www.candlesupply.com), (9 pgs.) (available at least by Jun. 29, 2000).

Pages from Ecowax, The Nature of Ecowax, Website (http://www.ngiwax.com/The%20Nature%200f%20Ecowax.htm), (2 pgs.) (available at least by Jul. 23, 2001).

Pages from Ecowax, Nature's Gifts, Inc., Website (http://ngiwax.com/ecowax.htm), (3 pgs.) (available at least Jul. 5, 2000).

Pages from Heartland Candleworks Website, 4 pages, available @ www.candleworks.org (available at least by Feb. 11, 2000).

Frahm, "Harvest Lights: The only soy-based candle, a bright idea," available @ http://www.extension.uiuc.edu/~stratsoy/new/news/html/909166253.html (2 pgs.) ( Oct. 23, 1998).

*In Business*, "America's Shining Example of Sustainable Business," available @ http://www.candleworks.org., (3 pgs.), (Mar./Apr. 1998).

Noller, Chemistry of Organic Compounds, *W. B. Saunders Company*, (pp. 181 and 192) (1957).

Orso, "New Use for Soybeans Has Bright Future," available @ http://www.unitedsoybean.com/news/nr981014.htm (2 pgs.) (Oct. 14, 1998).

Purdue Agriculture News, Purdue May Agriculture & Natural Resources Package, available @ http://purduenews.uns.purdue.edu/UNS/paks/agpak.digest.9605.html (3 pgs.) (May 1996).

Purdue News, "Purdue students put the happy back into birthday candles," available @ http://www.purdue.edu/UNS/html4ever/9611.Schweitzer.candles.html (3 pgs.) (Nov. 1996).

Purdue News, "Purdue students put the 'happy' back into birthday candles," available @ http://www.purdue.edu/UNS/html14ever/9604.schweitzer.html (2 pgs.) (May 1996).

Purdue University School Agriculture, 1998 Farm Progress Show, available @ http://www.admin.ces.purdue.edu/anr/98fps/fpspix/930.html (4 pgs.) (1998).

Tao, "Development of Vegetable Lipid-Based Candles," available at http://abe.www.ecn.purdue.edu/ABE/Research/research94/REPORT.94Book_68.html (2 pgs.) (1994).

Oliefabrik et al., "Paper coating", *Research Disclosure Journal*, Dec. 1996 (2 pgs.).

German Abstract of EP 536861 A1, "Wrapping paper for fatty foodstuffs of good biodegradability—having surface treated with hydrogenated animal or vegetable fat", *Derwent World Patents Index*, available at http://toolkit.dialog.com/intranet/cgi/present, Publication Date Apr. 14, 1993 (2 pgs.).

Japanese Abstract of JP 56032550 A, "Coating compsn. for paper bags protecting fruit on trees—comprises hydrogenated oil and/or solid natural fat with was, e.g. paraffin", *Derwent World Patents Index*, available at http://www.dialogclassic.com/main.vmgw, Publication Date Apr. 2, 1981 (1 pg.).

European Abstract of EP 811664 A1, "Coating compositions for e.g. foodstuffs—contg mono and di glyceride(s) and colophony ester(s)", *Derwent World Patents Index*, available at http://toolkit.dialog.com/intranet/cgi/present, Publication Date Dec. 10,1997 (1 pgs.).

\* cited by examiner

TRIACYLGLYCEROL BASED WAX COMPOSITIONS

BACKGROUND

Candles have been known and used for illumination since early civilization. The earliest candles are thought to have been developed by the Egyptians who soaked the pithy cores of reeds in molten tallow and to make rushlights or torches. The Romans are credited with developing the first candle which utilized a wick. The Romans also used tallow, derived from cattle or sheep suet, for candle wax. Around the middle ages beeswax was found to be suitable in candles. Beeswax candles were desirable over other candles because beeswax does not produce a smoky flame, or emit unpleasant odor when burned. Then, as now, beeswax candles were expensive, and prohibitively so, preventing most people from enjoying their advantages. Candles produced from molds first appeared in 15$^{th}$ century France.

In the American Northwest, Native Americans produced light by inserting oily candlefish (dried smelt) into the Y of a slit stick and lighting it. In a similar vein, the Stormy Petrel, and other birds having high fat content, were inserted with a wick and lit like candles.

America's first contribution to candlemaking occurred in colonial times when it was discovered that the grayish-green berries of bayberry bushes could be boiled to produce a sweet-smelling wax that burned cleanly. Unfortunately, extracting wax from bayberries is extremely tedious and the popularity of candles made from bayberry wax soon diminished. Candlemaking next benefited from the growth of the whaling industry because spermaceti, a wax obtained from the head of a sperm whale by crystallizing the whale oil, became widely available. Spermaceti, like beeswax, burned without an acrid odor and was also found to be harder than either beeswax or tallow. This was advantageous because spermaceti did not soften or bend in the heat of summer.

The Industrial Revolution next shaped the production of candles by providing machines which produced candles and paraffin wax, which is produced by refining oil and coal shales. Paraffin, a bluish-white wax, burned cleanly with no unpleasant odor and was more economical to produce than any previous candle fuel. Paraffin did have one drawback, a low melting point, which may have been a threat to its commercial viability if not for the introduction of stearic acid, a by-product of animal fat, into candles.

After the light bulb was introduced in the late nineteenth century the need for candles diminished. A renewed popularity for candles emerged, especially for holidays and religious ceremonies, in the first half of the twentieth century. Much of this growth can be attributed to the growth of petrochemical refining and commercial meat production, which produce the two main constituents of present day candles—paraffin and stearic acid.

Recently environmental, health and supply concerns have sprung up concerning the use of petroleum byproducts in candles. Candle wax formulations based upon natural materials, and in particular vegetable oils, have thus been proposed. However, the production of candles from these waxes has suffered several drawbacks, including cracking, air pocket formation, product shrinkage and a natural product odor associated with vegetable materials. Various soybean-based waxes have been reported to suffer performance problems relating to optimum flame size, effective wax and wick performance matching for an even burn, maximum burning time, failure to achieve a consistent appearance upon resolidification after melting, product color integration and/or product shelf life.

Additionally, there are several types of candles, including taper, votive, pillar, container candles and the like, each of which places its own unique requirements on the wax used in the candle. For example, container candles, where the wax and wick are held in a container, typically glass, metal or the like, require lower melting points, specific burning characteristics such as wider melt pools, and should desirably adhere to the container walls. The melted wax should preferably retain a consistent appearance upon resolidification.

In order to achieve the aesthetic and functional product surface and quality sought by consumers of candles, it would be advantageous to develop new waxes based on vegetable oil that overcome as many of these deficiencies as possible. Utilizing vegetable oil-based waxes would also provide an additional outlet for agricultural production and has the potential for reducing the cost of candle waxes due to a ready supply of raw materials. Accordingly, it would be advantageous to have vegetable based wax materials which can be used to form clean burning base materials for forming candles. The candle base materials should preferably have physical characteristics, e.g., in terms of melting point, hardness and/or malleability, that permit the material to be readily formed into container candles having a pleasing appearance and/or feel to the touch, as well as having desirable olfactory properties.

SUMMARY

The present invention relates to wax compositions that have a high triacylglycerol content, such as where a majority (i.e., at least about 50 wt. %) of the wax is a triacylglycerol component. In some instances, essentially the entire wax fraction may be made up of triacylglycerol material. The present waxes may suitably be chosen to have a melting point of about 49° C. to 57° C. (120° F. to 135° F.). Where the wax is to be used to form a container candle, the wax commonly has a melting point of about 50° C. to 57° C. (circa 122° F. to 135° F.) and, more commonly, about 51° C. to 55° C. (circa 124° F. to 131° F.).

The triacylglycerol stock employed in the present wax compositions typically has a fatty acid composition which includes about 14 wt. % to 20 wt. % palmitic acid (16:0), about 20 wt. % to 30 wt. % stearic acid (18:0 ), and about 45 wt. % to 60 wt. % monounsaturated 18 carbon fatty acid acid (18:1). The triacylglycerol components used to produce the present wax compositions can be provided by hydrogenating and/or blending vegetable oils, such as soybean oil, palm oil and cottonseed oil.

The fatty acid composition of the triacylglycerol stock can also include small amounts of one or more additional fatty acids, such as up to about 3 wt. % fatty acids having carbon chains of 14 atoms or less, no more than about 3 wt. % linoleic acid, no more than about 1 wt. % linolenic acid and/or minor amounts, e.g. no more than about 3 wt. %, of fatty acids having 20 or more carbon atoms.

One embodiment of a triacylglycerol stock which can be used to produce the present wax can be formed by blending partially and/or fully hydrogenated vegetable oils to produce a triacylglycerol composition with an Iodine Value of about 45 to 60 and the desired melting point, e.g., about 50° C. to 55° C. (122° F. to 131° F.). For example, a triacylglycerol stock can be formed by blending appropriate amounts of partially hydrogenated soybean oil and fully hydrogenated palm oil. As used herein, the term "fully hydrogenated vegetable oil" refers to a vegetable oil which has been hydrogenated to an Iodine Value of no more than about 5. Suitable triacylglycerol stocks can also be formed by partially hydrogenating a vegetable oil or a mixture of vegetable oils to produce a triacylglycerol composition having a desired degree of unsaturation, melting point and fatty acid composition. Instead of employing a highly hydrogenated vegetable oil, triacylglycerol material derived from precipitating a hard fat fraction (i.e., a higher melting point component of the material) from a vegetable oil may be employed. Hard fat fractions obtained in this manner are predominantly composed of triacylglycerols which have saturated fatty acyl groups. Triacylglycerol stocks with high percentages of saturated fatty acids generally have a higher melting point than corresponding triacylglycerol stocks with fatty acid compositions containing larger amounts of unsaturated fatty acids.

The present waxes have many applications including cosmetics and candle manufacture, particularly into container candles. Depending on the particular application, the present waxes may often include one or more of a variety of other additives in addition to the triacylglycerol component. Examples of such additives include colorants, fragrance oils, insect repellants, migration inhibitors, antioxidants and combinations thereof. When present, fragrance oils are typically present in amounts from about 2 wt. % to 10 wt. % although the present waxes may include higher amounts of fragrance oils, for example up to about 15 wt. % or even higher. Migration inhibitors can comprise up to about 5 wt. % or higher and customarily make up from about 0.1% to 2 wt. % of the wax. One type of suitable migration inhibitors are polymerization products formed from one or more alpha olefins having about 10 to 25 carbon atoms. The present wax may also include other additives, e.g., a glycerol fatty acid monoester may be included in the wax blend. The inclusion of a glycerol fatty acid monoester can enhance the enhance the ability of colorants to be homogeneously distributed and maintained throughout the wax.

The present wax is typically solid, firm but not brittle, generally somewhat malleable, has no free oil visible and is particularly good for use in forming container candles. The present waxes are also capable of providing consistent characteristics, such as appearance, upon cooling and resolidification (e.g., after being burned in a candle) of the melted wax. The wax is desirably formulated to promote surface adhesion to prevent the candle from pulling away from the container when the candle cools. In addition, it is desirable that the wax is capable of being blended with natural color additives to provide an even, solid color distribution.

The present candles are typically formed from triacylglycerol-based material, e.g., vegetable oil-based material, which is a biodegradable material that can be produced from renewable resources. The candles are generally clean burning and emit very little soot. The combination of low soot emission, biodegradability and production from renewable raw material makes the present candle a particularly environmentally friendly product.

If the present wax is used to produce a candle, the same standard wicks that are employed with other waxes (e.g., paraffin and/or beeswax) can be utilized. In order to fully benefit from the environmentally-safe aspect of the present wax, it is desirable to use a wick which does not have a metal core, such as a lead or zinc core. One example of a suitable wick material is a braided cotton wick.

A method of includes for making a candle using a wax which includes a substantial triacylglycerol component is also provided. The method includes (a) heating the wax to a temperature above the melting point of the wax to form a hot liquefied wax; (b) cooling the hot liquefied wax to a pour temperature to form a cooled liquefied wax, where the pour temperature is below the melting point of the wax and above the congeal point of the wax; (c) pouring the cooled liquefied wax into a container; and (d) further cooling the cooled liquefied wax in the container to a temperature below the congeal point of the wax to form a candle. The method may also include adding a fragrance and/or colorant to the wax. The fragrance and/or colorant may be added to the cooled hot liquefied wax prior to its introduction to the container or to the hot liquefied wax. As used herein, the term "congeal point" refers to the temperature at which a molten sample of a wax starts to form crystals. The "congeal point" can be determined according to ASTM procedure ASTM D-938 and is used as an indication of the temperature at which the wax ceases to flow.

DETAILED DESCRIPTION

The physical properties of a triacylglycerol are primarily determined by (i) the chain length of the fatty acyl chains, (ii) the amount and type (cis or trans) of unsaturation present in the fatty acyl chains, and (iii) the distribution of the different fatty acyl chains among the triacylglycerols that make up the fat or oil. Those fats with a high proportion of saturated fatty acids are typically solids at room temperature while triacylglycerols in which unsaturated fatty acyl chains predominate tend to be liquid. Thus, hydrogenation of a triacylglycerol stock ("TAGS") tends to reduce the degree of unsaturation and increase the solid fat content and can be used to convert a liquid oil into a semisolid or solid fat. Hydrogenation, if incomplete, also tends to result in the isomerization of some of the double bonds in the fatty acyl chains from a cis to a trans configuration. By altering the distribution of fatty acyl chains in the triacylglycerol moieties of a fat or oil, e.g., by blending together materials with different fatty acid profiles, changes in the melting, crystallization and fluidity characteristics of a triacylglycerol stock can be achieved.

Herein, when reference is made to the term "triacylglycerol-based material" the intent is to refer to a material of which a majority is made up of triacylglycerols. The present triacylglycerol-based material typically includes at least about 75 wt. % and may include about 90 wt. % or more triacylglycerol stock.

As employed herein, the terms "triacylglycerol stock" and "triacylglycerol component" are used interchangeably to refer to materials that are made up entirely of one or more triacylglycerol compounds. Commonly, the triacylglycerol stock or triacylglycerol component is a complex mixture of triacylglycerol compounds, which very often are derivatives of C16 and/or C18 fatty acids. The triacylglycerol stock, whether altered or not, is generally derived from various plant and/or animal sources, such as oil seed sources. The terms at least include within their scope: (a) such materials which have not been altered after isolation; (b) materials which have been refined, bleached and/or deodorized after isolation; (c) materials obtained by a process which includes fractionation of a triacylglycerol oil; and, also, (d) oils obtained from plant or animal sources and altered in some manner, for example through partial hydrogenation. Herein, the terms "triacylglycerols" and "triglycerides" are intended to be interchangeable. It will be understood that a triacylglycerol stock may include a mixture of triacylglycerols, and a mixture of triacylglycerol isomers. By the term "triacylglycerol isomers," reference is meant to triacylglycerols which, although including the same esterified carboxylic acid residues, may vary with respect to the location of the residues in the triacylglycerol. For example, a triacylglycerol oil such as a vegetable oil stock can include both symmetrical and unsymmetrical isomers of a triacylglycerol molecule which includes two different fatty acyl chains (e.g., includes both stearate and oleate groups).

As indicated above, any given triacylglycerol molecule includes glycerol esterified with three carboxylic acid molecules. Thus, each triacylglycerol includes three fatty acid residues. In general, oils extracted from any given plant or animal source comprise a mixture of triacylglycerols which is characteristic of the specific source. The mixture of fatty acids isolated from complete hydrolysis of the triacylglycerols in a specific source is referred to herein as a "fatty acid composition" of the triacylglycerols. By the term "fatty acid composition" reference is made to the relative amounts of the identifiable fatty acid residues in the various triacylglycerols. The distribution of specific identifiable fatty acids is characterized herein by the amounts of the individual fatty acids as a weight percent of the total mixture of fatty acids obtained from hydrolysis of the particular mixture of triacylglycerols. The distribution of fatty acids in the triacylglycerols in a particular oil or fat may be readily determined by methods known to those skilled in the art, such as by hydrolysis, subsequent derivatization (e.g., to form a mixture of methyl esters) and analysis by gas chromatography.

The total mixture of fatty acids in the present wax composition which is isolated after complete hydrolysis of any esters in a sample are referred herein to as the "fatty acid profile" of that sample. Thus, the "fatty acid profile" of a sample includes not only the fatty acids produced by the hydrolysis of the triacylglycerols and/or other fatty acid esters but also any free fatty acids present in the sample. In many instances, the present wax is substantially free of any free fatty acid, e.g., the wax has a free fatty acid content of no more than about 0.5 wt. %. As noted above, the distribution of fatty acids in a particular mixture may be readily determined by methods known to those skilled in the art, e.g., via gas chromatography or conversion to a mixture of fatty acid methyl esters followed by analysis by gas chromatography.

Palmitic acid (16:0) and stearic acid (18:0) are saturated fatty acids and triacylglycerol acyl chains formed by the esterification of either of these acids do not contain any carbon-carbon double bonds. The nomenclature in the above parentheses refers to the number of total carbon atoms in a straight chain fatty acid followed by the number of carbon-carbon double bonds in the chain. Many fatty acids such as oleic acid, linoleic acid and linolenic acid are unsaturated, i.e., contain one or more carbon-carbon double bonds. Oleic acid is an 18 carbon straight chain fatty acid with a single double bond (i.e., an 18:1 fatty acid), linoleic acid is an 18 carbon fatty acid with two double bonds or points of unsaturation(i.e., an 18:2 fatty acid), and linolenic is an 18 carbon fatty acid with three double bonds (i.e., an 18:3 fatty acid).

The fatty acid composition of the triacylglycerol stock which makes up a the significant portion of the present wax composition generally is made up predominantly of fatty acids having 16 or 18 carbon atoms. The amount of shorter chain fatty acids, i.e., fatty acids having 14 carbon atoms or less in the fatty acid profile of the triacylglycerols is generally very low, e.g., no more than about 3 wt. % and, more typically, no more than about 1 wt. %. The triacylglycerol stock generally includes a moderate amount of saturated 16 carbon fatty acid, e.g., at least about 14 wt. % and typically no more than about 25 wt. %, preferably from about 15 wt. % to 20 wt. %. As mentioned above, the fatty acid composition of the triacylglycerols commonly includes a significant amount of C18 fatty acid(s). In order to achieve a desirable container candle characteristics, the fatty acids typically include a mixture of saturated 18 carbon fatty acid(s), e.g., about 20 wt. % to 30 wt. % and, more suitably, about 23 wt. % to 27 wt. % stearic acid, and 18 carbon unsaturated fatty acids, e.g., about 45 wt. % to 60 wt. % and more typically about 50 wt. % to 57 wt. % 18:1 fatty acid(s), such as oleic acid. The unsaturated fatty acids are predominantly monounsaturated fatty acid(s).

The fatty acid composition of the triacylglycerol stock is typically selected to provide a triacylglycerol-based material with a melting point of about 49 to 57° C. When the present wax is to be used to produce a container candle, the wax suitably is selected to have a melting point of about 51 to 55° C. The desired melting point can be achieve by altering several different parameters. The primary factors which influence the solid fat and melting point characteristics of a triacylglycerol are the chain length of the fatty acyl chains, the amount and type of unsaturation present in the fatty acyl chains, and the distribution of the different fatty acyl chains within individual triacylglycerol molecules. The present triacylglycerol-based materials are formed from triacylglycerols with fatty acid profiles dominated by C18 fatty acids (fatty acids with 18 carbon atoms). Triacylglycerols with extremely large amounts of saturated 18 carbon fatty acid (also referred to as 18:0 fatty acid(s), e.g., stearic acid) tend to have melting points which would be too high for the producing the present candles since such materials may be prone to brittleness, cracking and may tend to pull away from the container into which the wax is poured. The melting point of such triacylglycerols can be lowered by blending in triacylglycerols with more shorter chain fatty acids and/or unsaturated fatty acids. Since the present triacylglycerol-based materials have fatty acid profiles in which C18 fatty acids predominate, the desired the melting point and/or solid fat index is typically achieved by altering the amount of unsaturated C18 fatty acids present (predominantly 18:1 fatty acid(s)).

Additionally, triacylglycerol based compositions which have fatty acid compositions including a significant amount of saturated C16 fatty acid on the one hand, or diminutive amounts of saturated C16 fatty acid on the other hand, can tend to exhibit undesirable physical characteristics, and specifically are visually unpleasing due to the inconsistent crystallization of the wax upon cooling (such as occurs in recooling of melted candle wax). Consistent characteristics and pleasing aesthetics in the recooled wax can be achieved by controlling the level of saturated C16 fatty acid present in the fatty acid composition of the triacylglycerol based materials used to produce the wax. In particular, it has been found that triacylglycerol-based waxes that have fatty acid compositions which include about 14 to 25 wt. % palmitic acid (16:0 fatty acid) generally tend to exhibit a much more consistent appearance upon resolidification after melting than do similar wax compositions derived entirely from soybean oil (soybean oil has a fatty acid composition which includes about 10 to 11 wt. % palmitic acid).

To enhance its physical properties, such as its capability of being blended with natural color additives to provide an even solid color distribution, in some instances the present wax may include a glycerol fatty acid monoester.

Monoesters which are produced by partial esterification of a glycerol with a mixture of fatty acids derived from hydrolysis of a triacylglycerol stock are suitable for use in the present wax compositions. Examples include monoglycerol esters of a mixture of fatty acids derived from hydrolysis of a partially or fully hydrogenated vegetable oil, e.g., fatty acids derived from hydrolysis of fully hydrogenated soybean oil. Where a glycerol fatty acid monoester is included in the present wax composition, it is generally present as a relatively minor amount of the total composition, e.g., the glycerol fatty acid monoester may constitute about 1 to 5 wt. % of the wax composition.

In some instances it may be advantageous to minimize the amount of free fatty acid(s) in the present wax. Since carboxylic acids can be somewhat corrosive, the presence of fatty acid(s) in a candle wax can increase its irritancy to skin. The presence of free fatty acid can also influence the olfactory properties of candles produced from the wax. The present triacylglycerol-based wax can be used to produce candles and, in particular, container candles, without the inclusion of free fatty acid(s) in the wax. Such embodiments of the present triacylglycerol-based wax suitably have a free fatty acid content ("FFA") of less than about 1.0 wt. % and, preferably no more than about 0.5 wt. %.

The composition(s) described herein can be used to provide candles from triacylglycerol-based materials having a melting point and/or solid fat content which imparts desirable molding and/or burning characteristics. The solid fat content, as determined at one or more temperatures, can be used as a measure of the fluidity properties of a triacylglycerol stock. The melting characteristics of the triacylglycerol-based material may be controlled based on its solid fat index. The solid fat index is a measurement of the solid content of a triacylglycerol material as a function of temperature, generally determined at number of temperatures over a range from 10° C. (50° F.) to 40° C. (104° F.). Solid fat content ("SFC") can be determined by Differential Scanning Calorimetry ("DSC") using the methods well known to those skilled in the art. Fats with lower solid fat contents have a lower viscosity, i.e., are more fluid, than their counterparts with high solid fat contents.

The melting characteristics of the triacylglycerol-based material may be controlled based on its solid fat index to provide a material with desirable properties for forming a candle. Although the solid fat index is generally determined by measurement of the solid content of a triacylglycerol material as a function over a range of 5 to 6 temperatures, for simplicity triacylglycerol-based materials are often characterized in terms of their solid fat contents at 10° C. ("SFI-10") and/or 40° C. ("SFI-40").

One measure for characterizing the average number of double bonds present in a triacylglycerol stock which includes triacylglycerol molecules with unsaturated fatty acid residues is its Iodine Value. The Iodine Value of a triacylglycerol or mixture of triacylglycerols is determined by the Wijs method (A.O.C.S. Cd 1–25) incorporated herein by reference. For example, soybean oil typically has an Iodine Value of about 125 to about 135 and a melting point of about 0° C. to about –10° C. Hydrogenation of soybean oil to reduce its Iodine Value to about 90 increases the melting point of the material as evidenced by the increase in its melting point to about 10 to 20° C. Further hydrogenation can produce a material which is a solid at room temperature and may have a melting point of 65° C. or even higher. Typically, the present candles are formed from vegetable oil-based waxes which include a triacylglycerol stock having an Iodine Value of about 45 to about 60, and more suitably about 45 to about 55, and preferably about 50 to 55. The present waxes (including the triacylglycerol-based material and other components blended therewith) commonly have an Iodine Value of about 40–55 and, more suitably, about 45 to 55.

Feedstocks used to produce the triacylglycerol component in the present candle stock material have generally been neutralized and bleached. The triacylglycerol stock may have been processed in other ways prior to use, e.g., via fractionation, hydrogenation, refining, and/or deodorizing. Preferably, the feedstock is a refined, bleached triacylglycerol stock. The processed feedstock material may be blended with one or more other triacylglycerol feedstocks to produce a material having a desired distribution of fatty acids, in terms of carbon chain length and degree of unsaturation. Typically, the triacylglycerol feedstock material is hydrogenated to reduce the overall degree of unsaturation in the material and provide a triacylglycerol material having physical properties which are desirable for a candle-making base material.

Suitable hydrogenated vegetable oils for use in the present triacylglycerol-based material includes hydrogenated soybean oil, hydrogenated cottonseed oil, hydrogenated sunflower oil, hydrogenated canola oil, hydrogenated corn oil, hydrogenated olive oil, hydrogenated peanut oil, hydrogenated safflower oil or mixtures thereof. The vegetable oil may be hydrogenated to obtain a desired set of physical characteristics, e.g., in terms of melting point, solid fat content and/or Iodine value. The hydrogenation is typically carried out at elevated temperature, such as about 205° C. to about 230° C. (400° F. to 450° F.), and relatively low hydrogen pressure (e.g., no more than about 25 psi) in the presence of a hydrogenation catalyst. One example of a suitable hydrogenation catalyst is a nickel catalyst, such as a powdered nickel catalyst provided as a 20–30 wt. % suspension in a solid vegetable oil.

The present triacylglycerol stock can be produced by mixing a partially hydrogenated refined, bleached vegetable oil, such as a refined, bleached soybean oil which has been hydrogenated to an IV of about 60–70, with a second oil seed-derived material having a higher melting point, e.g., a fully hydrogenated palm oil. For example, this type of partially hydrogenated soybean oil can be blended with the fully hydrogenated palm oil in a ratio which ranges from about 70:30 to 90:10, and more suitably about 75:25 to 85:15. As will be recognized by one skilled in the art, these numbers are merely approximations and depend not only upon the plant material from which the triacylglycerol stock is produced but also the hydrogenation level of the triacylglycerol stock. The triacylglycerol stock produced thereby preferably has the characteristics described above and suitably has a melting point of about 50 to 57° C., an Iodine Value from about 40–55 and a 16:0 content from about 15 to 18 wt. %. The triacylglycerol stock can be used alone as a wax to form candles or additional wax materials can be added to the triacylglycerol stock.

Although not preferred, the triacylglycerol component of the wax can also be mixed with a minor amount of a free fatty acid component to achieve desired characteristics, such as melting point. When present, the free fatty acid is present in minimal amounts, preferably less than about 10 wt. % and more preferably no more than about 1 wt. %. The free fatty acid component is often derived from saponification of a vegetable-oil based material and commonly includes a mixture of two or more fatty acids. For example, the fatty acid component may suitably include palmitic acid and/or stearic acid, e.g., where at least about 90 wt. % of the fatty acid which makes up the fatty acid component is palmitic acid, stearic acid or a mixture thereof. In general, the higher the ratio of the hydrogenated oil to the fatty acid, the softer the product. A higher percentage of fatty acid generally produces a harder product. However, too high a level of a free fatty acid, such as palmitic acid, in the wax can lead to cracking or breaking.

Not only do the present waxes include the triacylglycerol component described above, the present waxes can also include other waxes, such as beeswax (which is primarily ceryl myristate), exotic plant waxes (e.g., carnauba and/or bayberry wax), mineral waxes (e.g., montan wax) and petroleum waxes (e.g., paraffin waxes). Although these additional waxes can be combined with the triacylglycerol component, the present waxes preferably include a majority of the triacylglycerol stock discussed above. Preferably, the triacylglycerol portion makes up at least 75 wt. % and, commonly, at least 85 wt. % of the wax materials.

Although the triacylglycerol stock can be used for many application, including cosmetics, the triacylglycerol stock is well suited for use as candle wax, particularly for container candles. The triacylglycerol stock of the present invention not only has the melting point and hardness desirable in container candle waxes, the present triacylglycerol wax also has the proper surface adhesion characteristics so the wax does not pull away from the container when cooled. Additionally, the present triacylglycerol stock provides a consistent, even appearance when resolidified and does not exhibit undesirable mottling in the candle which results from uneven wax crystallization.

When the triacylglycerol stock is used in candle wax, the triacylglycerol stock can further comprise one or more non-wax components such as colorants, fragrance oils, insect repellants, migration inhibitors, antioxidants and color stabilizing additives. The color stabilizing additives preferably absorb ultraviolet light to prevent colorant fading. A wide variety of coloring and scenting agents, well known in the art of candle making, are available for use with waxy materials.

Typically, one or more dyes or pigments is employed provide the desired hue to the color agent, and one or more perfumes, fragrances, essences or other aromatic oils is used provide the desired odor to the scenting agent. The coloring and scenting agents generally also include liquid carriers which vary depending upon the type of color-or scent-imparting ingredient employed. The use of liquid organic carriers with coloring and scenting agents is particularly suitable because such carriers are compatible with triacylglycerol-based waxes as well as petroleum-based waxes and related organic materials. As a result, such coloring and scenting agents tend to be readily absorbed into waxy materials. As a result, coloring and/or scenting agent can often be introduced into the waxy material when it is in the form of prilled granules.

The colorant is an optional ingredient and is commonly made up of one or more pigments and/or dyes. Colorants are typically added in a quantity of about 0.001–2 wt. % of the waxy base composition. In the candlemaking art, pigments are generally solid color particles suspended, not dissolved, in wax and are used to coat the outside of the candle with color. Pigments are preferred when a solid wall of color, similar to paint, is desired. If a pigment is employed, it is typically an organic toner in the form of a fine powder suspended in a liquid medium, such as a mineral oil. It may be advantageous to use a pigment that is in the form of fine particles suspended in a vegetable oil, e.g., an natural oil derived from an oilseed source such as soybean or corn oil. The pigment is typically a finely ground, organic toner so that the wick of a candle formed eventually from pigment-covered wax particles does not clog as the wax is burned.

Dyes, on the other hand, dissolve in the wax and are used to provide a more translucent color to the wax. Dyes are available in both liquid and powder form, and if a dye constituent is utilized, it may be dissolved in an organic solvent. A variety of pigments and dyes suitable for candle making are listed in U.S. Pat. No. 4,614,625, the disclosure of which is herein incorporated by reference. The preferred carriers for use with organic dyes are organic solvents, such as relatively low molecular weight, aromatic hydrocarbon solvents; e.g. toluene and xylene. Since dyes tend to ionize in solution, they are more readily absorbed into the wax, whereas pigment-based coloring agents tend to remain closer to the surface of the wax.

Candles often are designed to appeal to the olfactory as well as the visual sense. This type of candle usually incorporates a fragrance oil in the waxy body material. Fragrance oil is often added to the wax in amounts up to about 15 wt. % although amounts ranging from 3 to 8 wt. % are more common. As the waxy material is melted in a lighted candle, there is a release of the fragrance oil from the liquefied wax pool. The scenting agent may be an air freshener, an insect repellent or serve one or more of such functions.

The air freshener ingredient commonly is a liquid fragrance comprising one or more volatile organic compounds which are available from perfumery suppliers such IFF, Firmenich Inc., Takasago Inc., Belmay, Noville Inc., Quest Co., and Givaudan-Roure Corp. Most conventional fragrance materials are volatile essential oils. The fragrance can be a synthetically formed material, or a naturally derived oil such as oil of Bergamot, Bitter Orange, Lemon, Mandarin, Caraway, Cedar Leaf, Clove Leaf, Cedar Wood, Geranium, Lavender, Orange, Origanum, Petitgrain, White Cedar, Patchouli, Lavandin, Neroli, Rose and the like.

A wide variety of chemicals are known for perfumery such as aldehydes, ketones, esters, alcohols, terpenes, and the like. A fragrance can be relatively simple in composition, or can be a complex mixture of natural and synthetic chemical components. A typical scented oil can comprise woody/earthy bases containing exotic constituents such as sandalwood oil, civet, patchouli oil, and the like. A scented oil can have a light floral fragrance, such as rose extract or violet extract. Scented oil also can be formulated to provide desirable fruity odors, such as lime, lemon or orange.

Synthetic types of fragrance compositions either alone or in combination with natural oils such as described in U.S. Pat. Nos. 4,314,915; 4,411,829; and 4,434,306; incorporated herein by reference. Other artificial liquid fragrances include geraniol, geranyl acetate, eugenol, isoeugenol, linalool, linalyl acetate, phenethyl alcohol, methyl ethyl ketone, methylionone, isobornyl acetate, and the like. The scenting agent can also be a liquid formulation containing an insect repellent such as citronellal or neem oil, or a therapeutic agent such as eucalyptus or menthol. Once the coloring and scenting agents have been formulated, the desired quantities are combined with waxy material which will be used to form the body of the candle. For example, the coloring and/or scenting agents can be added to the waxy materials in the form of prilled wax granules. When both coloring and scenting agents are employed, it is generally preferable to combine the agents together and then add the resulting mixture to the wax. It is also possible, however, to add the agents separately to the waxy material. Having added the agent or agents to the wax, the granules are coated by agitating the wax particles and the coloring and/or scenting agents together. The agitating step commonly consists of tumbling and/or rubbing the particles and agent(s) together. Preferably, the agent or agents are distributed substantially uniformly among the particles of wax, although it is entirely possible, if desired, to have a more random pattern of distribution. The coating step may be accomplished by hand, or with the aid of mechanical tumblers and agitators when relatively large quantities of prilled wax are being colored and/or scented.

Certain additives may be included in the present wax compositions to decrease the tendency of colorants, fragrance components and/or other components of the wax to migrate to an outer surface of a candle. Such additives are referred to herein as "migration inhibitors." The wax may include about 0.1 to 5.0 wt. % and, more typically, about 0.5 to 2.0 wt. % of a migration inhibitor. One type of compounds which can act as migration inhibitors are polymerized alpha olefins, more particularly polymerization products formed alpha olefins having at least 10 carbon atoms and, more commonly from one or more alpha olefins having 10 to about 25 carbon atoms. One suitable example of such as polymer is an alpha olefin polymer sold under the tradename Vybar® 103 polymer (mp 168° F. (circa 76° C.); available from Baker-Petrolite, Sugarland, Tex.). The inclusion of sorbitan triesters, such as sorbitan tristearate and/or sorbitan tripalmitate and related sorbitan triesters formed from mixtures of fully hydrogenated fatty acids, in the present wax compositions may also decrease the propensity of colorants, fragrance components and/or other components of the wax to migrate to the candle surface. The inclusion of either of these types of migration inhibitors can also enhance the flexibility of the base wax material and decrease its chances of cracking during the cooling processes that occur in candle formation and after extinguishing the flame of a burning candle. For example, it may be advantageous to include up to about 5.0 wt. % and, more commonly, about 0.1–2.0 wt. % of a migration inhibitor, such as an alpha olefin polymer, in the present wax materials.

Additionally, because the present waxes can contain components which include some degree of unsaturated fatty acids, the present waxes may contain antioxidants. Numerous examples of antioxidants are known. Although many antioxidants are suitable for use as present lipid soluble antioxidants are preferred. Antioxidants found in natural sources, such as tocopherols (i.e., alpha tocopherol), carotenoids, and flavonoids, are suitable. Other suitable antioxidants include t-butylhyrdoquinone (TBHQ) or butylated hydroxytoluene (BHT).

Surprisingly and unexpectedly it has been discovered that the candles with excellent performance properties can be produced by heating a triacylglycerol based wax to a temperature above the melting point of the wax to form a hot liquefied wax, cooling the hot liquefied wax to a temperature to a pour temperature below the melting point of the wax but above the congeal point of the wax to form a cool liquefied wax, introducing the cooled liquefied wax into a designated container and subsequently cooling the wax in the container to a temperature below its congeal point, thereby solidifying the wax. Preferably, the hot liquefied wax is cooled to about 10 to 15° C. below the melting point of the wax to provide the cool liquefied wax. As stated above, the waxes can include several optional ingredients. When colorants are used they are preferably added to the hot liquefied wax due to their stability. Alternatively, the colorant can be added at almost any stage of the process, and, indeed, the wax can be previously colored wax can be used in the present method. As most fragrances are volatile, it commonly is preferable to add fragrance oil(s) to the wax at as low a temperature as possible as is practicable, such as adding the fragrance to the cool liquefied wax at its pour temperature. However, as the temperatures required to melt triacylglycerol based waxes are not as high as those required for conventional waxes, fragrance can be added earlier in the process, such as to the hot liquefied wax, and the fragrance can even be incorporated into the wax even prior to the candle forming method. Generally, this method is not well suited to wax compositions which contain migration inhibitors because the migration inhibitors tend to increase the congeal point of the wax to about the same temperature as the melting point of the wax.

Typically, the candle wick is anchored in the middle of the bottom end of the container in which the wax is poured. The wick may also be inserted into either the hot liquefied wax, the cool liquefied wax or into the solidified wax. Candle wicks usable in the present candles include standard wicks used for conventional candles. Such wicks can be made of braided cotton and may have a metal or paper core. Because most container candles tend to have relatively large widths, larger wicks are preferred to provide an ideal melt pool.

The present method for producing candles is advantageous in that triacylglycerol based candles formed according to this method can provide one-pour convenience so that second, and subsequent pours of the wax are not necessarily required to fill in a depression left as the wax cools.

Candles can be produced from the triacylglycerol-based material using a number of other methods. In one common process, the vegetable oil-based wax is heated to a molten state. If other additives such as colorants and/or fragrance oils are to be included in the candle formulation, these may be added to the molten wax or mixed with vegetable oil-based wax prior to heating. The molten wax is then commonly solidified around a wick. For example, the molten wax can be poured into a mold which includes a wick disposed therein. The molten wax is then cooled to the solidify the wax in the shape of the mold. Depending on the type of candle being produced, the candle may be unmolded or used as a candle while still in the mold.

The candle wax may be fashioned into a variety of forms, commonly ranging in size from powdered or ground wax particles approximately one-tenth of a millimeter in length or diameter to chips, flakes or other pieces of wax approximately two centimeters in length or diameter. Where designed for use in compression molding of candles, the waxy particles are generally spherical, prilled granules having an average mean diameter no greater than about one (1) millimeter.

Prilled waxy particles may be formed conventionally, by first melting a triacylglycerol-based material, in a vat or similar vessel and then spraying the molten waxy material through a nozzle into a cooling chamber. The finely dispersed liquid solidifies as it falls through the relatively cooler air in the chamber and forms the prilled granules that, to the naked eye, appear to be spheroids about the size of grains of sand. Once formed, the prilled triacylglycerol-based material can be deposited in a container and, optionally, combined with the coloring agent and/or scenting agent.

Kits for forming articles (e.g., candles) from the present triacylglycerol wax are also provided by the present application. These kits can include one or more of the directions for forming candles from the present invention described above and a quantity of the present triacylglycerol-based wax, as well as a colorant, fragrance, wick material, molds and other additives discussed herein. Another kit embodied in the present invention provides instructions for carrying out the candle making method described herein and may also include any of the previously mentioned additional candle components.

The following examples are presented to illustrate the present invention and to assist one of ordinary skill in making and using the same. The examples are not intended in any way to otherwise limit the scope of the invention.

EXAMPLE 1

A vegetable oil-based wax suitable for use in making candles was produced according to the following procedure. A partially hydrogenated refined, bleached soybean oil (about 85 parts by weight) and a fully hydrogenated palm oil (about 15 parts by weight) were heated to about 140° F. (circa 60° C.) and stirred to thoroughly blend the components to form a homogenous mixture. The partially hydrogenated refined, bleached soybean oil had a melting point of about 112–115° F. (circa 44–46° C.) and an Iodine Value of about 60–64. The resulting blend had a melting point of about 126° F. (circa 52° C.), an Iodine Value of 54 and was suitable for use in a container candle.

The fatty acid composition of the resulting blend is shown in Table 2 below. The fatty acid compositions of the partially hydrogenated refined and bleached soybean oil ("PH-SBO") and a fully hydrogenated palm oil ("FH-Palm") are also shown for comparison.

TABLE 2

| Fatty Acid Compositions (Wt. %) | | | |
| --- | --- | --- | --- |
| Fatty Acid(s) | PH-SBO | FH-Palm | 85/15 Blend |
| ≦C14 | <0.3 | 1–2 | 0.4 |
| 16:0 | 10.4 | 42–44 | 14.9 |
| 18:0 | 18.3 | 53–55 | 23.7 |
| 18:1 | 66.8 | — | 56.8 |
| 18:2 | 2.9 | — | 2.5 |
| 18:3 | 0.1 | — | — |
| Other | 1.0 | — | 0.5 |

The final candle formulation may be used to directly produce candles or may be stored in a molten state in a heated tank. Often it may be more convenient to convert the candle wax into particle form. As described above, the molten candle wax may be converted into flakes or prilled granules to facilitate handling and storage in small lots.

EXAMPLE 2

A vegetable oil-based wax suitable for use in making candles was produced according to the procedure described in Example 1 from the partially hydrogenated refined, bleached soybean oil (about 80 parts by weight) and fully hydrogenated palm oil (about 20 parts by weight). The resulting blend had a melting point of about 128° F. (circa 53° C.), an Iodine Value of 50 and was suitable for use in producing a container candle. The fatty acid composition of the resulting blend is shown in Table 3 below. The fatty acid composition of a typical refined and bleached soybean oil ("RB-SBO") is also shown for comparison.

TABLE 3

| Fatty Acid Compositions (Wt. %) | | |
| --- | --- | --- |
| Fatty Acid(s) | RB-SBO | 80/20 Blend |
| ≦C14 | <0.1 | ≦0.4 |
| 16:0 | 10–11 | 16 |
| 18:0 | 4–6 | 27.6 |
| 18:1 | 20–30 | 52.8 |
| 18:2 | 50–60 | 2.5 |
| 18:3 | 5–10 | — |
| Other | <1 | 0.7 |

EXAMPLE 3

A container candle was produced using the wax prepared according to Example 2. The vegetable oil-based wax of Example 2 (94 parts by weight) was heated to about 140° F. (circa 600C.). Candle jasmine fragrance oil (6 parts by weight; French Color & Chemical Co., Englewood, N.J.) and a blue liquid dye (parts by weight; available from French Color & Chemical Co., Englewood, N.J. under the product number D-878 French Color & Chemical Co., Englewood, N.J.) were blended into the molten vegetable oil-based wax. The resulting blend was cooled to about 115° F. (circa 46° C.) and then poured into a 10.5 oz, 3 inch diameter glass container containing a paper core cotton wick (available from Wicks Unlimited, Cutchogue, N.Y. under the product number 60-44-18P). The molten wax was allowed to cool to room temperature and the resulting container candle was used in the burn test described below.

The wick in the candle formed from the wax of Example 2 was lit and the candle was allowed to burn for 4 hours. During the burn test the flame reached a maximum flame height of 30 mm. The melt pool formed during the burn test reached all the way out to the edges of the container and achieved a maximum depth of ¼ inch. The melt pool reached a maximum temperature of 160° F. (circa 71° C.) during the duration of the burn. The wax had a disappearance rate of 4.6 g/hr during the burn test (based on the total weight loss of the candle over the 4 hour burn period). No sooting was noted during the duration of the burn test. Upon cooling the wax solidified to form a smooth surface with little or no marring. The time required for the wax to resolidify with the candle exposed to ambient temperature was about 20 minutes.

For comparison purposes, a commercial container candle formed from paraffin wax was lit and the candle was allowed to burn for 4 hours. During the burn test the flame reached a maximum flame height of about 40 mm. The melt pool formed during the burn test reached all the way out to the edges of the container and achieved a maximum depth of about ½ inch. The melt pool reached a maximum temperature of 155° F. (circa 68° C.) during the duration of the burn. Sooting was observed during the duration of the burn test and some deposition of soot on the inside of the container was observed. Upon cooling the paraffin wax solidified to form a smooth surface with little or no marring. The time required for the wax to resolidify with the candle exposed to ambient temperature was about 15 minutes.

All percentages discussed herein are percentages by weight unless otherwise specified.

As will be understood by one skilled in the art, for any and all purposes, particularly in terms of providing a written description, all ranges and subranges described herein also encompass any and all possible combinations of ranges, subranges and/or specific values disclosed herein. As will also be understood by one skilled in the art, all language such as "up to", "at least", "greater than", "no more than", "less than" and the like refer to threshold values which can be used to define boundaries of ranges and/or subranges as discussed above.

The present invention has been described with reference to various specific and illustrative embodiments and techniques. However, it should be understood that many variations and modifications may be made while remaining within the spirit and scope of the invention.

What is claimed is:

1. A wax comprising a triacylglycerol component; wherein the wax has a melting point of about 50° C. to 57° C.; and the triacylglycerol component has a fatty acid composition which includes about 14 to 25 wt. % 16:0 fatty acid; about 20 to 30 wt. % 18:0 fatty acid; and about 50 to 60 wt. % 18:1 fatty acid.

2. The wax of claim 1 wherein the triacylglycerol component has an Iodine Value of about 45 to about 60.

3. The wax of claim 1 wherein the wax has an Iodine Value of about 40 to about 55.

4. The wax of claim 1 wherein the wax comprises at least about 75 wt. % of the triacylglycerol component.

5. The wax of claim 1 further comprising one or more additives selected from the group consisting of fragrance oils, colorants, migration inhibitors, antioxidants and color stabilizers.

6. The wax of claim 1 further comprising about 2 to 10 wt. % of a fragrance oil.

7. The wax of claim 1 wherein the wax has a melting point of about 51° C. to 55° C.

8. The wax of claim 1 wherein the triacylglycerol component has a fatty acid composition which includes about 15 to 20 wt. % 16:0 fatty acid, about 20 to 30 wt. % 18:0 fatty acid and about 50 to 57 wt. % 18:1 fatty acid.

9. The wax of claim 1 consisting essentially of the triacylglycerol component.

10. The wax of claim 1 wherein the wax further comprises a fragrance oil, a colorant, an antioxidant or a mixture thereof.

11. The wax of claim 1 having a free fatty acid content of no more than about 0.5 wt. %.

12. The wax of claim 1 further comprising an additional wax selected from the group consisting of beeswax, paraffin wax, microcrystalline wax, carnauba wax, bayberry wax, montan wax and combinations thereof.

13. The wax of claim 12 comprising no more than about 15 wt. % of the additional wax.

14. The wax of claim 1 wherein the triacylglycerol component has a fatty acid composition which includes no more than about 50 wt. % saturated fatty acids.

15. A method for making a candle, comprising:
(a) heating a wax, which has a melting point and a congeal point, to a temperature above the melting point of the wax thereby forming a hot liquefied wax; wherein the wax comprises at least about 50 wt. % of a triacylglycerol component; and the melting point is greater than the congeal point;
(b) cooling the hot liquefied wax to a pour temperature thereby forming a cooled liquefied wax, wherein the pour temperature is below the melting point and above the congeal point;
(c) pouring the cooled liquefied wax into a container; and
(d) cooling the cooled liquefied wax in the container to a temperature below the congeal point of the wax thereby forming a candle;
wherein the wax has a melting point of about 50° C. to about 57° C.; and the triacylglycerol component has a fatty acid composition which includes about 14 to 25 wt. % 16:0 fatty acid; about 20 to 30 wt. % 18:0 fatty acid; and about 45 to 60 wt. % 18:1 fatty acid.

16. A kit for making a candle comprising a wax which includes a triacylglycerol component; wherein the wax has a melting point of about 50° C. to 57° C.; and the triacylglycerol component has a fatty acid composition which includes about 14 to 25 wt. % 16:0 fatty acid; about 20 to 30 wt. % 18:0 fatty acid; and about 50 to 60 wt. % 18:1 fatty acid.

17. The kit of claim 16 further comprising at least one of a fragrance oil, a colorant, a wick and a container.

18. A container candle comprising a wax within a container and a wick embedded within the wax; wherein the wax has a melting point of about 51° C. to 55° C. and comprises at least about 75 wt. % of a triacylglycerol component; and the triacylglycerol component has a fatty acid composition which includes about 15 to 20 wt. % palmitic acid; about 20 to 30 wt. % stearic acid; and about 50 to 57 wt. % 18:1 fatty acid.

19. The candle of claim 18 wherein the wax comprises at least about 90 wt. % of the triacylglycerol component.

20. The candle of claim 18 wherein the wax has an Iodine Value of about 45 to 55.

21. A candle comprising a wick and a wax; wherein the wax has a melting point of about 50° C. to 57° C. and comprises a triacylglycerol component; and the triacylglycerol component has a fatty acid composition which includes about 14 to 25 wt. % 16:0 fatty acid; about 20 to 30 wt. % 18:0 fatty acid; and about 50 to 60 wt. % 18:1 fatty acid.

22. The candle of claim 21 wherein the wax further comprises an alpha olefin polymer, a glycerol fatty acid monoester or a mixture thereof.

* * * * *